(12) United States Patent
Chang

(10) Patent No.: US 6,414,461 B1
(45) Date of Patent: Jul. 2, 2002

(54) SCANNER THAT CONTROLS STEPPING MOTOR TORQUE

(75) Inventor: Te-Chih Chang, Hsin-Chu (TW)

(73) Assignee: Mustek Systems Inc., Hsin-Chu (TW)

( * ) Notice: Subject to any disclaimer, the term of this patent is extended or adjusted under 35 U.S.C. 154(b) by 0 days.

(21) Appl. No.: 09/740,897

(22) Filed: Dec. 21, 2000

(51) Int. Cl.$^7$ .............................. H02P 8/20; H04N 1/04
(52) U.S. Cl. ..................................... 318/696; 358/423
(58) Field of Search ................................. 318/685, 696; 358/505, 506, 409, 410, 412, 421, 423

(56) References Cited

U.S. PATENT DOCUMENTS 5,745,254 A * 4/1998 Satou ........................ 358/412
6,101,006 A * 8/2000 Bryant et al. ............... 358/506
6,115,149 A * 9/2000 Lai et al. .................... 358/505

* cited by examiner

*Primary Examiner*—Bentsu Ro
(74) *Attorney, Agent, or Firm*—Weston Hsu

(57) ABSTRACT

A scanner has a housing, a scanning module for scanning a document, a driving module for driving the scanning module, and a control circuit for controlling the scanner. The driving module comprises a stepping motor for driving the scanning module forward and backward so that the scanning module is able to scan the entire area of the document. The control circuit controls the stepping motor to generate different torque so that the scanning module can scan the document at different speeds.

7 Claims, 6 Drawing Sheets

SCANNER THAT CONTROLS STEPPING MOTOR TORQUE

BACKGROUND OF THE INVENTION

1. Field of the Invention

The present invention relates to scanner. More specifically, the present invention relates to a scanner that controls stepping motor torque.

2. Description of the Prior Art

Computers have become increasingly ubiquitous in almost all aspects of life, from home to office. With the growth of computers, the requirements of personal image processing are increasing. Scanners are therefore becoming more and more popular. And, for catering to the various image requirements of users, scanners have to offer the users various resolution options. When using a scanner, users can choose a suitable resolution to scan documents or pictures. For example, when a user generates icons for a homepage, he or she will choose a lower scanning resolution. For high quality digital images, a higher resolution will be chosen.

Please refer to FIG. 1 and FIG. 2. FIG. 1 is a function block diagram of a prior art scanner 10. FIG. 2 is a schematic circuit diagram of the scanner 10 of FIG. 1. The scanner 10 comprises a scanning module 12, a stepping motor 16, and a control circuit 18. The scanning module 12 is used to scan a document and generate image data. The control circuit 18 controls the stepping motor 16 to generate a torque for driving the scanning module 12. As shown in FIG. 2, when control circuit 18 drives the scanning module 12, it applies a voltage to the stepping motor 16, activating the stepping motor 16. When the stepping motor 16 operates in a steady-state condition, the current of the stepping motor 16 is fixed, and the torque of the stepping motor 16, thus, is fixed. A consequence of this is that, when the scanning module 12 scans the document at a high resolution, the stepping motor 16 generates a surplus torque that causes excessive noise and shock. This excessive noise and shock influences the quality of the image generated by the scanner 10.

SUMMARY OF THE INVENTION

It is therefore a primary objective of the present invention to provide a scanner that controls the torque of the stepping motor. The scanner uses a suitable torque when scanning a document.

In a first embodiment of the present invention, the scanner comprises a scanning module for scanning a document, a driving module for driving the scanning module, and a control circuit for controlling the scanner. The driving module comprises a stepping motor for driving the scanning module forward and backward. The control circuit controls the current of the stepping motor and thus controls the torque that the stepping motor produces.

In a second embodiment of the present invention, the control circuit further comprises a driving program, a processor for executing the driving program, and a memory for storing a torque table. The torque table records a plurality of torque values. Each of the torque values corresponds to a predetermined condition when the stepping motor produces a torque. When the driving program is executed, the driving program chooses one of the torque values according to the predetermined condition, and transmits a driving signal to the driving module. The stepping motor of the driving module generates a suitable torque according to the driving signal, and then drives the scanning module.

It is an advantage of the present invention that the stepping motor of the scanner generates a suitable torque to drive the scanning module according to a resolution that the scanning module uses. Therefore, the stepping motor does not generate excessive torque.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

Figure 1:
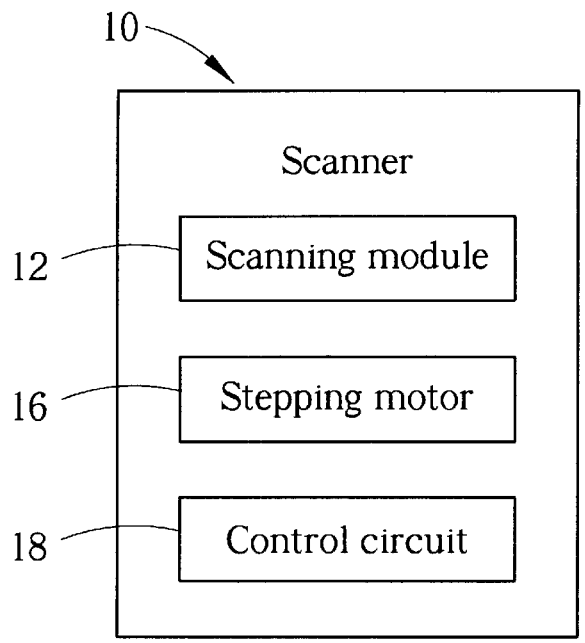
FIG. 1 is a function block diagram of a prior art scanner.
Figure 2:
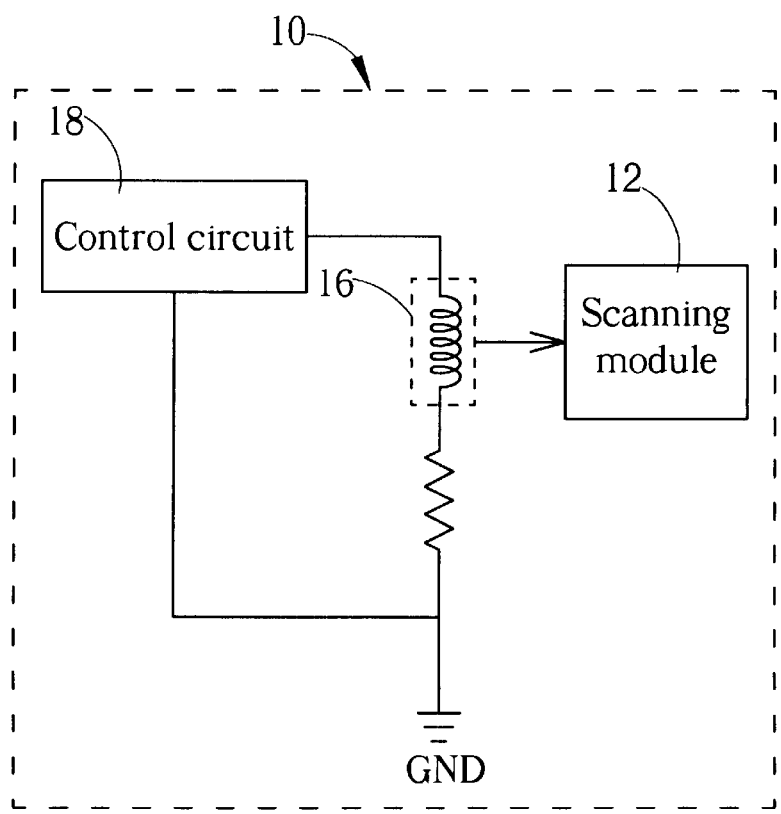
FIG. 2 is a schematic circuit diagram of the scanner in FIG. 1.
Figure 3:
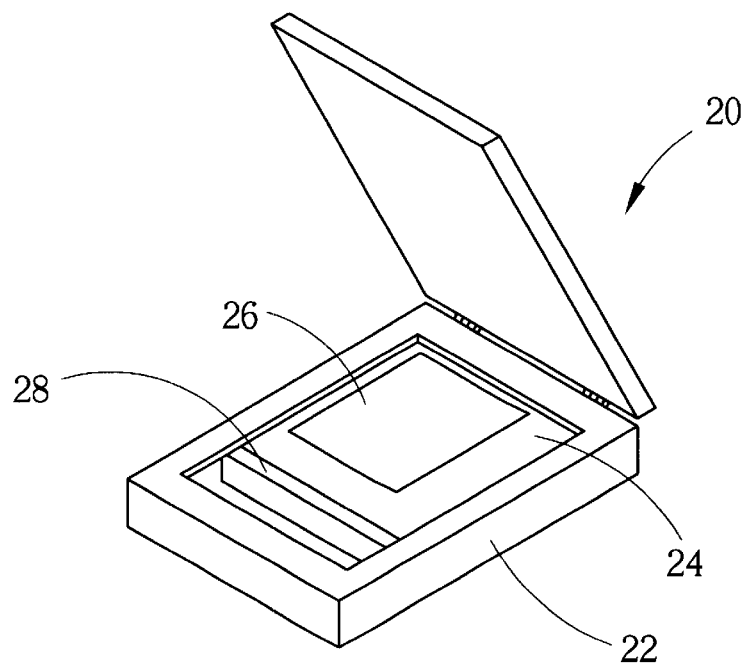
FIG. 3 is a perspective view of a first embodiment scanner of the present invention.
Figure 4:
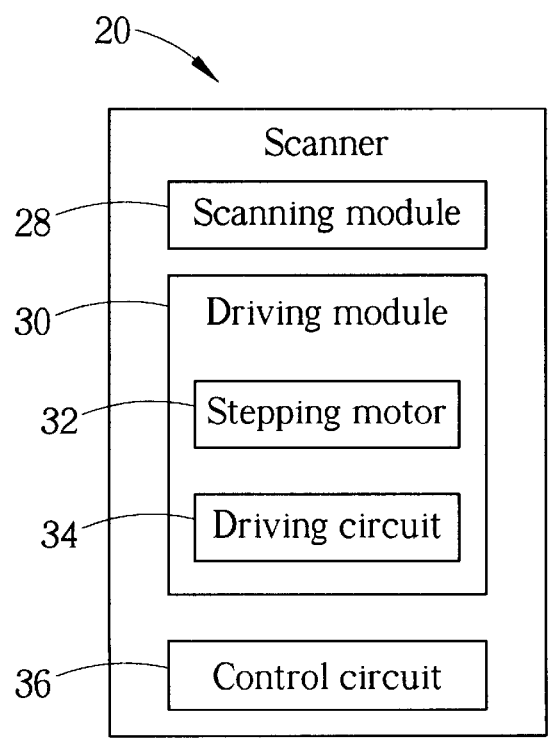
FIG. 4 is a function block diagram of the scanner in FIG. 3.

Please refer to FIG. 3 and FIG. 4. FIG. 3 is a perspective view of a first embodiment scanner 20 of the present invention. FIG. 4 is a function block diagram of the scanner 20 in FIG. 3. The scanner 20 comprises a housing 22 that has a transparent platform 24, a scanning module 28 installed inside the housing 22 for scanning a document 26 placed on the transparent platform 24, a driving module 30 installed inside the housing 22 for driving the scanning module 28, and a control circuit 36 for controlling the operations of the scanner 20. The driving module 30 comprises a stepping motor 32, and a motor driving circuit 34. The stepping motor 32 drives the scanning module 28 forward and backward so that the scanning module 28 is able to scan the entire area of the document 26. The motor driving circuit 34 is used to power the stepping motor 32 to generate a torque.

Figure 5:
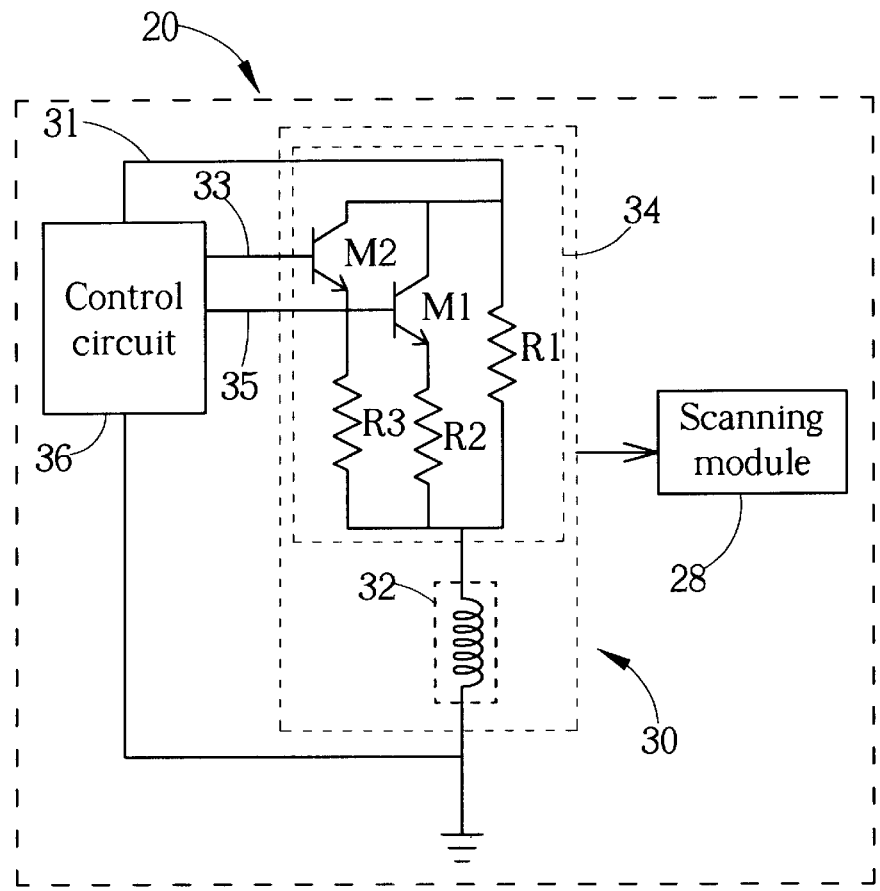
FIG. 5 is a schematic circuit diagram of the scanner in FIG. 3.
Figure 6:
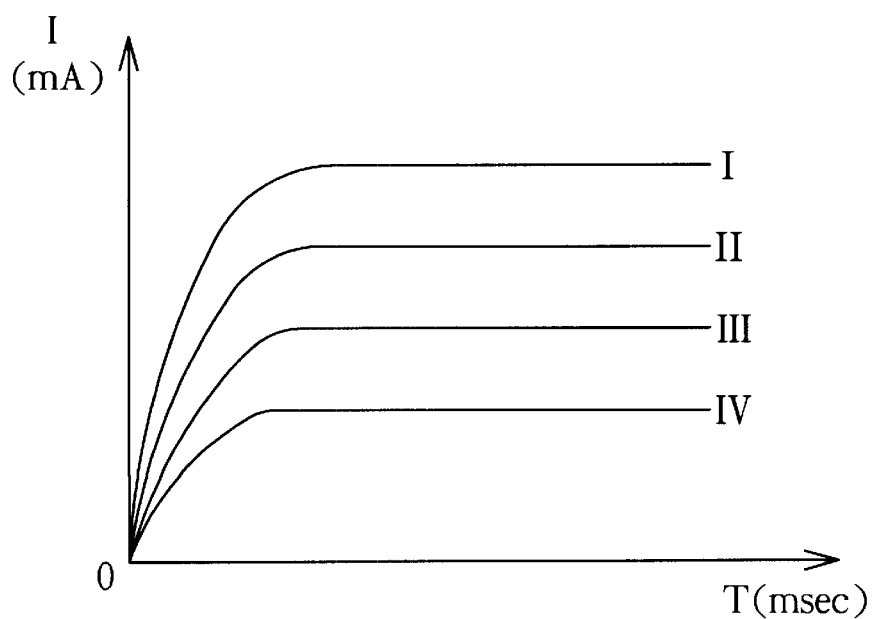
FIG. 6 is a current vs. time diagram showing the current of the stepping motor of the scanner in FIG. 3.

Please refer to FIG. 5 and FIG. 6. FIG. 5 is a schematic circuit diagram of the scanner 20 shown in FIG. 3. FIG. 6 is a current vs. time diagram showing the current of the stepping motor 32 of the scanner 20. The horizontal axis of FIG. 6 indicates time, and the vertical axis indicates the current of the stepping motor 32. As shown is FIG. 5, the driving circuit 34 comprises two transistors M1 and M2, and three resistors R1, R2, and R3. With a power line 31, the control circuit 36 is electrically connected to the resistor R1 and the collectors of the two transistors M1, M2. With a first signal line 33 and a second signal line 35, the control circuit 36 is respectively electrically connected to the bases of the two transistors M1, M2. The control circuit 36 outputs driving signals respectively to the two transistors M1, M2 to control on/off states of the two transistors M1, M2.

When the scanning module 28 scans the document 26 in the lowest resolution, control circuit 36 will apply a high voltage both on the first and the second signal lines 33 and 35 to switch on the two transistors M1 and M2 so that the stepping motor 32 generates the greatest torque for driving the scanning module 28 at the highest speed. When the scanning module 28 scans the document 26 in a normal resolution, control circuit 36 will apply a high voltage on one of the first or the second signal lines 33 and 35 and apply a low voltage on the other signal line 33, 35 so that one of the two transistors M1 and M2 is switched on and the other transistor M1, M2 is switched off. The current of stepping motor 32 is thus decreased, and the stepping motor 32 generates a normal torque to drive the scanning module 28 at a normal speed. When the scanning module 28 scans the document 26 in the highest resolution, the control circuit 36 will apply a low voltage on both the first and the second signal lines 33 and 35 to switch off the two transistors M1 and M2 so that the current of the stepping motor 32 is again decreased, and the stepping motor 32 generates a minimal torque to drive the scanning module 28 at a low speed. Furthermore, if the resistance of the two resistors R2 and R3 are different, the control circuit 36 can control the on/off states of the two transistor M1 and M2 to drive the scanning module 28 with even more speed options. For example, suppose the resistance of the resistor R2 is less than the resistance of the resistor R3. When the transistor M1 is switched on and the transistor M2 is switched off, the current of the stepping motor 32 is greater than the current of the stepping motor 32 when the transistor M1 is switched off and the transistor M2 is switched on. The three resistors R1, R2 and R3, thus, could be designed to have different resistances so that the control circuit 36 is able to control the stepping motor 32 to generate various torques.

As shown in FIG. 6, a curve I indicates the current of the stepping motor 32 when the two transistor are both switched on and the scanning module 28 scans the document 26 in the lowest resolution. Two curves II and III indicate the current of the stepping motor 32 when the scanning module 28 scans the document 26 in normal resolutions. The curve II indicates the current of the stepping motor 32 when the transistor M1 is switched on and the transistor M2 is switched off. The curve III indicates the current of the stepping motor 32 when the transistor M1 is switched off and the transistor M2 is switched on. A curve IV indicates the current of the stepping motor 32 when the two transistor are both switched off and the scanning module 28 scans the document 26 at the highest resolution. With the first and the second signal lines 33 and 35, the control circuit 36 outputs a corresponding driving signal to the motor driving circuit 34. Therefore, the control circuit 36 controls the on/off states of the two transistors M1, M2 and changes the current of the stepping motor 32 to allow the stepping motor 32 to generate a corresponding torque.

Figure 7:
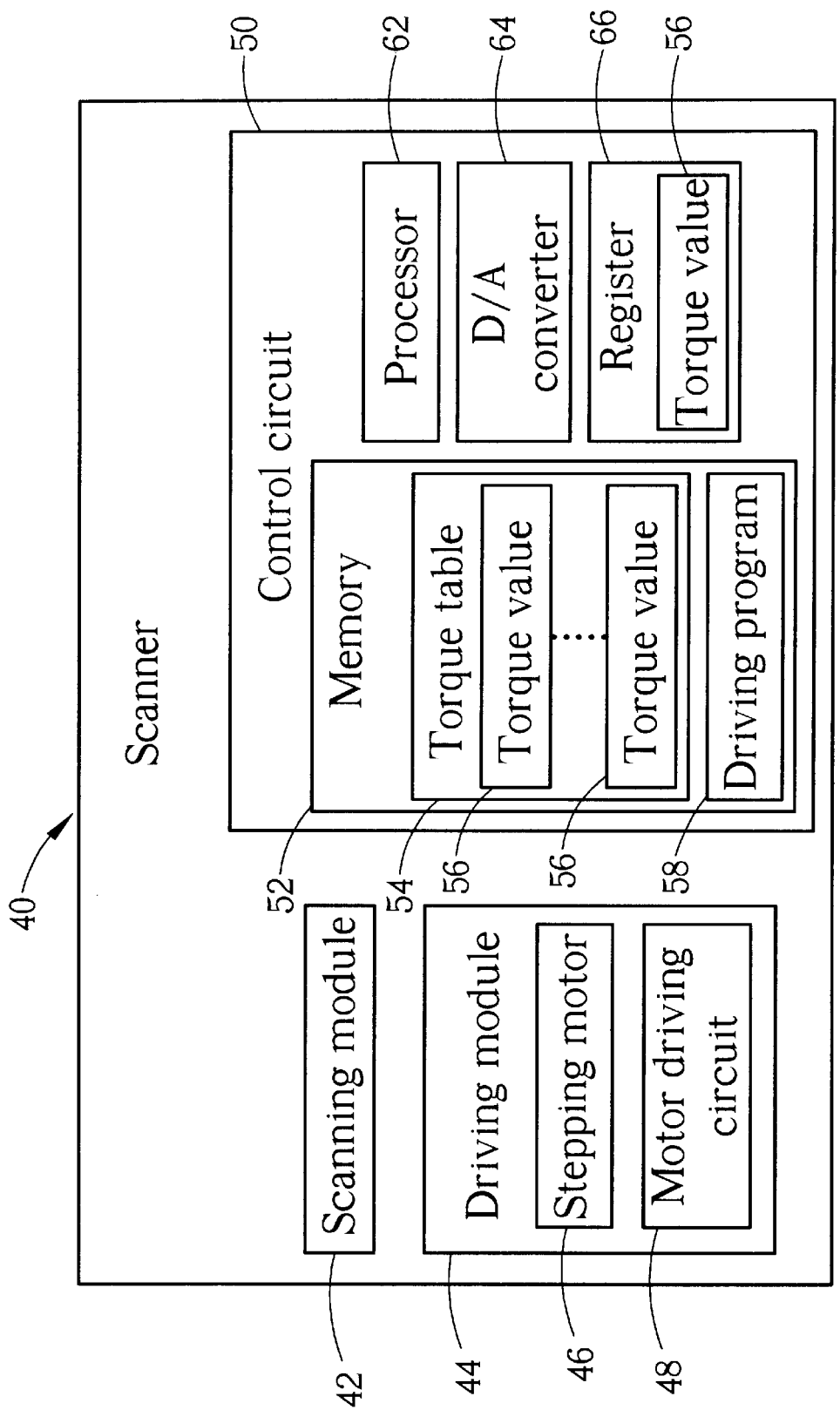
FIG. 7 is a function block diagram of second embodiment scanner of the present invention.

Please refer to FIG. 7. FIG. 7 is a function block diagram of second embodiment scanner 40 of the present invention. The scanner 40 comprises a scanning module 42 for scanning a document and generating corresponding image data, a driving module 44 for driving the scanning module 42, and a control circuit 50 for controlling the operations of the scanner 40. The driving module 44 comprises a stepping motor 46 for driving the scanning module 42 forward and backward so that the scanning module 42 is able to scan the entire area of the document, and a motor driving circuit 48 for driving the stepping motor 46 to generate a torque.

The control circuit 50 comprises a memory 52 for storing a torque table 54 and a driving program 58, a processor 62 for executing the driving program 58, and a digital to analog (D/A) converter 64 for converting a digital signal received from the processor 62 to an analog driving signal and transmitting the analog driving signal to the motor driving circuit 48. The torque table 54 records a plurality of torque values 56. The torque values 56 record the most suitable currents or voltages for the scanner 40 when scanning the document at different resolutions. Each of the torque values 56 corresponds a predetermined condition for the stepping motor 46 to produce a corresponding torque. The driving program 58 chooses one of the torque values 56 according to the predetermined condition and transmits the torque value 56 to the D/A converter 64. The D/A converter 64 then transmits a corresponding analog driving signal to the motor driving circuit 48 according to the torque value 56 received from the driving program 58. The motor driving circuit 48 generates a corresponding torque according to the analog driving signal, and drives the scanning module 42 forward and backward.

Figure 8:
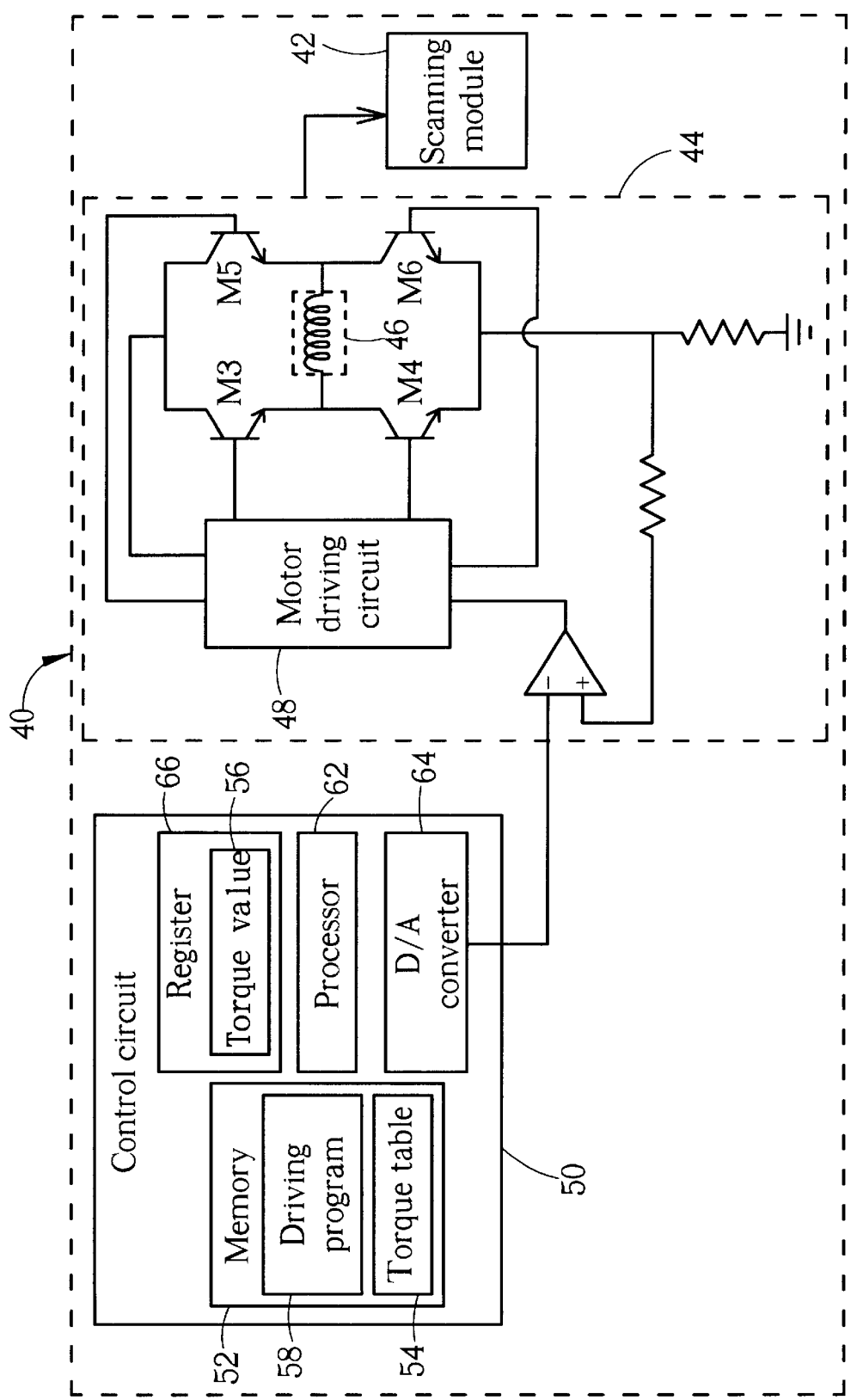
FIG. 8 is a schematic circuit diagram of the scanner in FIG. 7.

Please refer to FIG. 8. FIG. 8 is a schematic circuit diagram of the scanner 40 in FIG. 7. The control circuit 50 further comprises a register 66. The driving program 58 chooses one of the torque values 56 according to the desired resolution requested of the scanner 40, and then stores the torque value 56 in the register 66. The D/A converter 64 converts the torque value 56 stored in the register 66 to a corresponding analog driving signal, and transmits the analog driving signal to the motor driving circuit 48 to handle the stepping motor 46. The stepping motor 46, thus, generates a corresponding torque to drive the scanning module 42.

Figure 9:
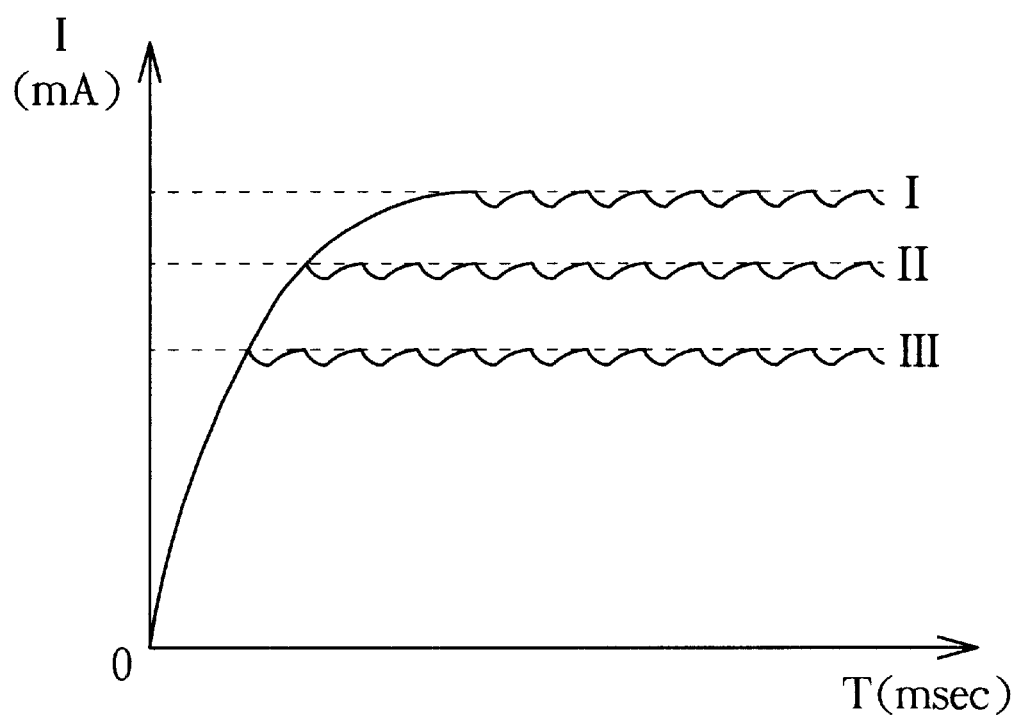
FIG. 9 is a current vs. time diagram showing the current of the stepping motor of the scanner in FIG. 7.

Please refer to FIG. 9. FIG. 9 is a current vs. time diagram showing the current of the stepping motor 46 of the scanner 40 in FIG. 7. The horizontal axis of FIG. 9 indicates time, and the vertical axis indicates the current of the stepping motor 46. As shown in FIG. 8, the motor driving circuit 48 is electrically connected to four transistors M3, M4, M5, and M6. The motor driving circuit 48 applies different voltages to the bases of the four transistors M3, M4, M5, and M6 to control the on/off states of the four transistors M3, M4, M5, and M6 and change the current to the stepping motor 46. As shown in FIG. 9, three curves I, II and III indicate the current of the stepping motor 46 according to different on/off states of the four transistors M3, M4, M5, and M6. Therefore, the control circuit 50 controls the on/off states of the four transistors M3, M4, M5, and M6 to change the current to the stepping motor 46 and to control the torque the stepping motor 46 produces.

In contrast to the prior art scanner that uses a fixed torque to drive its scanning module at any resolution, the scanner of the present invention controls the current to the stepping motor to generate various suitable torques according to the resolution required of the scanning module. The stepping motor, thus, produces less noise and shock. The image quality generated by the scanner is therefore improved.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A scanner comprising:
   a housing having a transparent platform, a document to be scanned being placed on the transparent platform;
   a scanning module movably installed inside the housing for scanning the document;
   a driving module installed inside the housing for driving the scanning module, the driving module comprising:
   (a) a stepping motor for driving the scanning module forward and backward so that the scanning module scans the document; and (b) a motor driving circuit for controlling the stepping motor according to a driving signal; and a control circuit for controlling the operations of the scanner, the control circuit comprising a memory, the memory storing a torque table and a driving program, the torque table recording a plurality of torque values, each of the torque values corresponding a predetermined condition when the stepping motor produces the corresponding torque, and the driving program chooses one of the torque values according to the predetermined condition, the motor driving circuit receiving the corresponding driving signal according to the torque value chosen by the driving program and controlling the stepping motor so that the stepping motor generates a torque according to the driving signal;

wherein the control circuit controls the stepping motor to generate different torque so that the scanning module scans the document at different speeds.

2. The scanner of claim 1 wherein the control circuit comprises a processor and a digital to analog (D/A) converter, the processor being used to execute the driving program, the D/A converter being used to convert a digital signal received from the processor to an analog driving signal, the analog driving signal being transmitted to the motor driving circuit, and the driving program transmits the torque value to the D/A converter, the D/A converter then transmitting the analog driving signal to the motor driving circuit.

3. The scanner of claim 2 wherein the control circuit further comprises a register for storing the torque value chosen by the driving program, and the D/A converter converts the torque value stored in the register to the corresponding analog driving signal.

4. The scanner of claim 1 wherein the control circuit controls the current of the stepping motor so that the stepping motor generates different torque.

5. The scanner of claim 1 wherein the control circuit controls the stepping motor to generate different torque according to a resolution that the scanning module uses when scanning the document.

6. The scanner of claim 5 wherein a higher resolution used by the scanning module requires a lower torque generated by the stepping motor.

7. The scanner of claim 5 wherein a lower resolution used by the scanning module requires a higher torque generated by the stepping motor.

* * * * *